United States Patent
Chen

(10) Patent No.: US 6,595,486 B2
(45) Date of Patent: Jul. 22, 2003

(54) NON-REFILLABLE VALVE

(75) Inventor: De Fu Chen, Zhejang (CN)

(73) Assignee: Discount Refrigerants, Inc., Denver, CO (US)

( * ) Notice: Subject to any disclaimer, the term of this patent is extended or adjusted under 35 U.S.C. 154(b) by 120 days.

(21) Appl. No.: 09/948,328

(22) Filed: Sep. 6, 2001

(65) Prior Publication Data

US 2003/0042447 A1 Mar. 6, 2003

(51) Int. Cl.$^7$ ............................................. F16K 31/44
(52) U.S. Cl. ..................................... 251/82; 137/614.2
(58) Field of Search ........................... 251/720, 356; 137/614.18, 614.2

(56) References Cited

U.S. PATENT DOCUMENTS

| | | | |
|---|---|---|---|
| 3,589,397 A | * 6/1971 | Wagner | 137/614.2 |
| 3,985,332 A | 10/1976 | Walker | 251/111 |
| 4,207,915 A | 6/1980 | Becker et al. | 137/117 |
| 4,232,704 A | 11/1980 | Becker et al. | 137/218 |
| 4,284,097 A | 8/1981 | Becker et al. | 137/218 |
| 4,420,010 A | 12/1983 | Becker et al. | 137/116 |
| 4,543,980 A | * 10/1985 | van der Sanden | 137/315.04 |
| 4,573,611 A | 3/1986 | O'Connor | 222/147 |
| 4,697,611 A | 10/1987 | Winland et al. | 137/14 |
| 4,813,575 A | 3/1989 | O'Connor | 222/147 |
| 4,921,214 A | 5/1990 | Jernberg | 251/335.2 |
| 5,036,876 A | 8/1991 | Jernberg | 137/454.6 |
| 5,295,502 A | 3/1994 | Lane | 137/315 |
| 5,467,798 A | 11/1995 | Baker et al. | 137/614.2 |
| 5,657,790 A | 8/1997 | Mohn | 137/614.2 |
| 5,794,660 A | 8/1998 | Mohn | 137/614.2 |

* cited by examiner

Primary Examiner—Gene Mancene
Assistant Examiner—John Bastianelli
(74) Attorney, Agent, or Firm—Sheridan Ross P.C.

(57) ABSTRACT

A nonrefillable valve is provided that allows for an initial filling of a container, but prevents subsequent refilling of the container. The valve operating assembly includes a valve stem and a valve core which is slidably received in the distal end of the valve stem. In a first position, the valve core resides above a rim or protrusion within the chamber. After filling of the container, a second position is defined when the valve stem is operated to force the valve core beyond the protrusion and in seating engagement with a valve seat, thus sealing the container. The valve is then selectively operated in a third or open position to discharge the container as desired. Subsequent refilling of the container is prevented by the force of fluid reentering the valve which forces the valve core to its seated engagement with the valve seat.

22 Claims, 3 Drawing Sheets

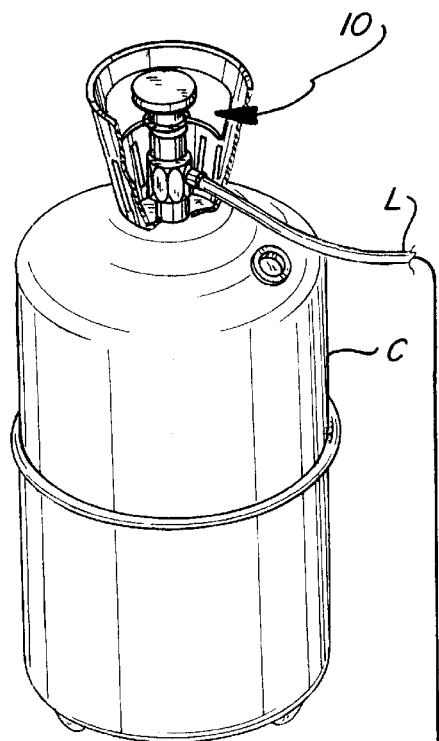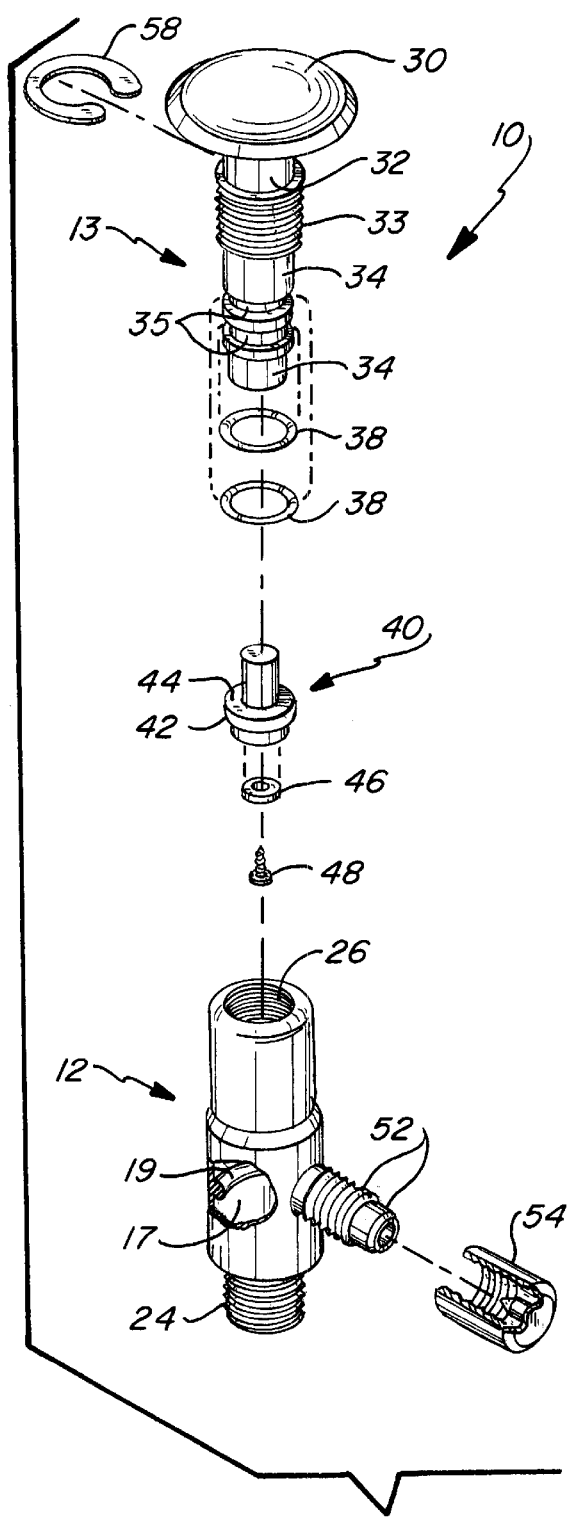
Fig_1
Fig_2

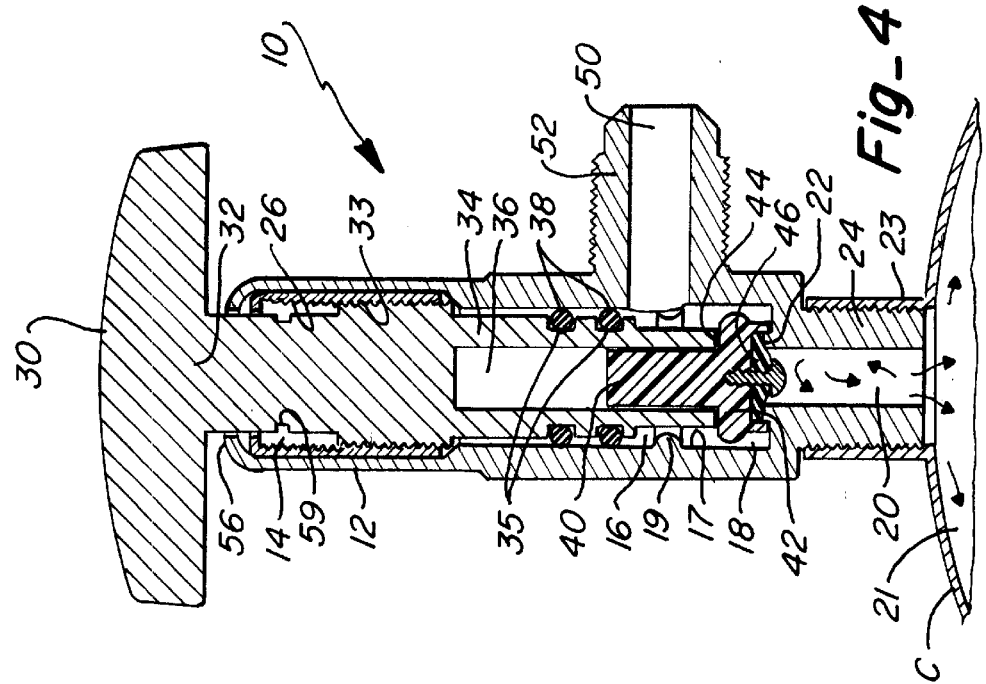
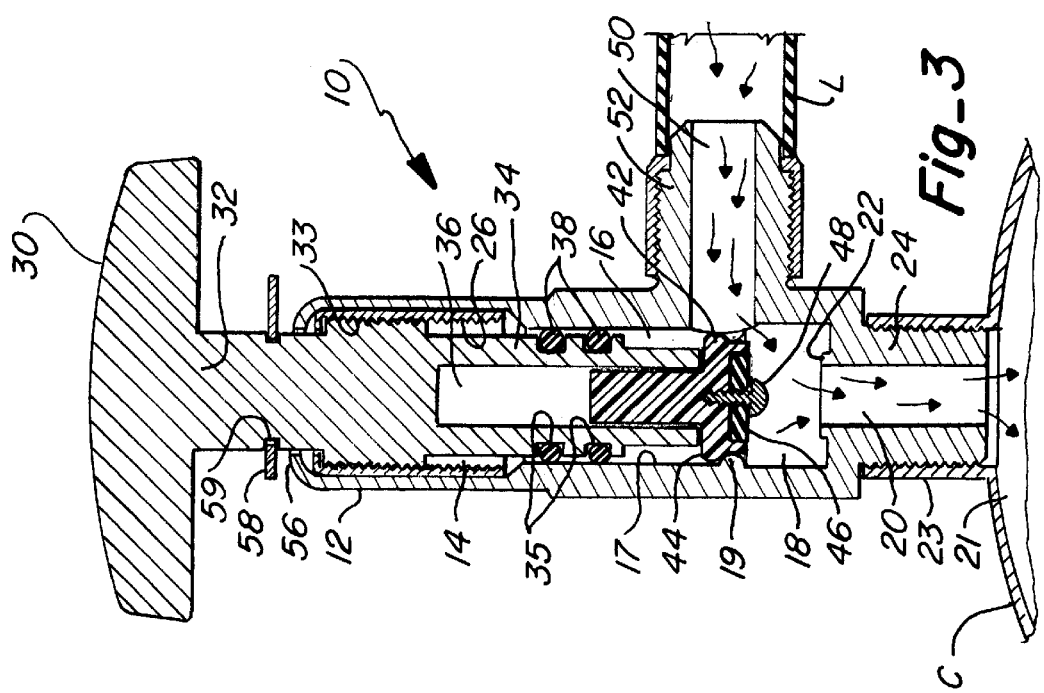

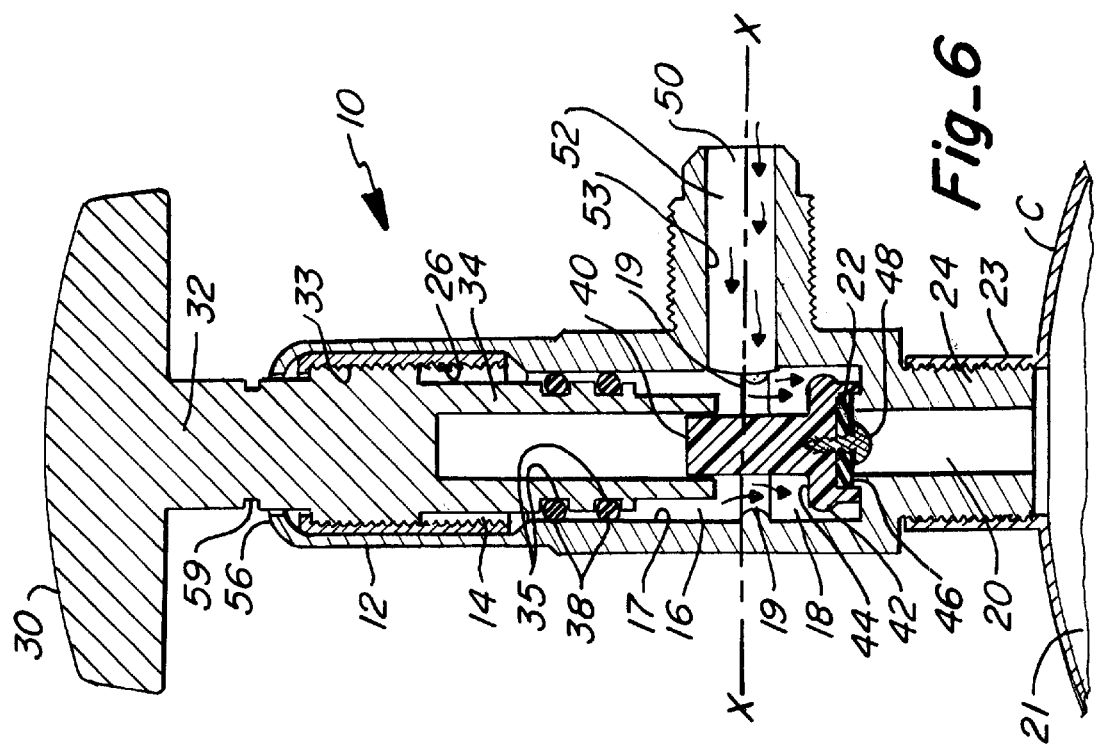
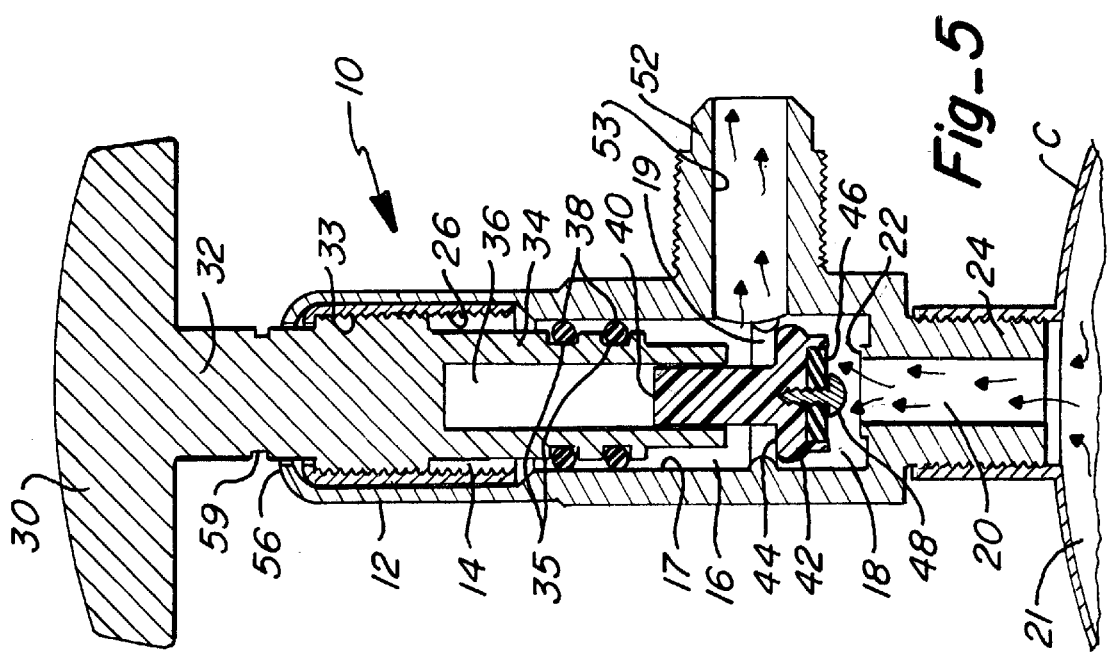

NON-REFILLABLE VALVE

FIELD OF THE INVENTION

This invention relates to nonrefillable or single use valves used in pressurized systems. More particularly, the invention relates to a nonrefillable valve especially adapted for use with pressurized vessels or containers wherein the construction of the valve allows the pressure container to be filled once, and then selectively discharged; however, subsequent refill of the pressure container is prevented.

BACKGROUND OF THE INVENTION

Valves are commonly used to control the discharge of fluid from a pressure container or vessel. Typically, such valves include a handle or some other means by which a user can selectively control discharge of the container. Pressure containers may contain any number of products such as butane, propane, refrigerant gas, or any number of other types of industrial gases.

Due to governmental regulations in the United States, pressure containers containing refrigerants may only be filled once. Thus, such pressure containers can be initially charged or filled with the refrigerant; however, once the refrigerant has been discharged from the container, the container may not be refilled again.

There are a number of prior art valves which exist not only for use with non-refillable containers, but also refillable containers. One group of patents representative of valves which are used in conjunction with nonrefillable containers include patents assigned to Amtrol, Inc., of West Warwick, R.I. One specific example includes the U.S. Pat. No. 4,813,375. This reference discloses a nonrefillable valve including a housing with a central bore, and three distinct portions within the central bore of particular diameters. The lower portion of the central bore is narrower than a middle portion which in turn is narrower than an upper portion. The lower end of the valve housing sealingly engages the pressure container. A valve stem is rotatably positioned in the upper portion of the central bore. The valve stem itself includes a vertical bore formed in its bottom portion. A resilient valve sealing member is slidably received in the bore of the valve stem. When the pressure container is filled, a top rim portion of the sealing member is pressingly positioned in the upper portion of the central bore. After filling, the valve sealing member is pushed downward into the middle portion which allows the valve to contact a seating surface thus sealing the pressure container. A non-compressed top rim of the sealing member is wider than the upper portion of the central bore, which prevents the sealing member from moving back up into the upper portion of the central bore. If an attempt is made to refill the container, the sealing member engages the seating surface thus preventing refill. Additional U.S. patents disclosing similar valves include the U.S. Pat. Nos. 5,295,502; 4,573,611; and 5,036,876.

While the foregoing references may be adequate for their intended purposes, there is still a need for a valve of simple and reliable construction which prevents refilling of a pressure container.

SUMMARY OF THE INVENTION

One object of the present invention is to provide a nonrefillable valve for pressure containers, for example, cylinders used in industrial applications to hold and store pressurized industrial gas. Another object of the invention is to provide a valve which easily permits discharge of the pressure container, but will automatically prevent refilling of the container without the user or operator of the valve having to further manipulate the valve. Another object of the invention is to provide the above described functionality with a valve of simple and reliable construction.

The structure of the valve of the present invention includes a valve body having a longitudinal chamber extending therethrough. A lower portion of the chamber communicates with the opening or orifice of a pressure container to which the valve is attached. A valve stem is positioned within the chamber. A handle is integral with an upper portion of the valve stem providing a means for a user to manipulate the positioning of the valve stem within the chamber. A valve core is slidably received in a bore formed on the lower end of the valve stem. The valve core includes a sealing member formed on the lower portion thereof. A nozzle attaches to the valve body, the nozzle including an orifice or passageway which communicates with the chamber of the valve body. A transverse opening formed on the sidewall of the valve body communicates between the nozzle passageway and the chamber.

An inner concentric rim, flange, or protrusion is formed on the internal sidewall of the chamber adjacent the passageway of the nozzle. When the empty pressure container is to be filled with a pressurized fluid, the valve core is placed in a first open position wherein a larger diameter portion of the valve core flange resides in the chamber above the inner concentric rim. In this first position, fluid may flow through the nozzle passageway into a lower portion of the chamber, and then through an opening or orifice communicating with the pressure container. After the pressure container has been filled, the handle is operated to move the valve stem downwardly within the valve body thus forcing the valve core flange beyond the inner concentric rim. The valve stem can be moved to force the sealing member of the valve core against a valve seat which seals the pressure container, thus defining a second closed position.

In order to evacuate or empty the contents of the pressure container, the handle is unscrewed thereby raising the valve stem, and allowing the sealing member to be unseated from engagement with the valve seat. Fluid pressure raises the valve core allowing the fluid to escape the pressure container back through the lower portion of the chamber and back through the nozzle passageway.

Refilling of the pressure container is prevented even when the valve stem is raised to allow the sealing member to be unseated. This is accomplished due to contact between the upper surface of the valve core flange and the inner concentric rim, thereby preventing the valve core flange from being positioned above the inner concentric rim. A third position is therefore defined when the valve stem is raised to allow the valve core to be unseated from the valve seat. In this third position, the majority of the area of the nozzle passageway communicating with the chamber resides above the valve core flange. In other words, a transverse opening into the chamber is created where the nozzle intersects the internal sidewall of the chamber, and the majority the cross-sectional area of this opening lies above the inner concentric rim, and likewise, above the valve core flange. Therefore, a pressurized flow of fluid entering the nozzle passageway results in a greater majority of such flow entering the portion of the chamber above the valve core flange, thus forcing the flange downwardly, and thereby resulting in the sealing member engaging the valve seat. Because the valve core is freely slidable within the bore of the valve stem, there is no means by which to operate the handle in order to place the valve core back in its first position. In this manner, the valve of the present invention functions as a check valve to prevent refill of the container.

In addition to an inner concentric rim, other constricting structures can be provided to prevent the valve core from returning to its first position once a user closes the valve. For example, one or more arc like segments, or one or more protrusions may extend from the inner wall of the valve body into the chamber, thereby constituting the constriction which must be overcome by the particular sized valve core flange.

The valve core may be one integral unit made of a resilient material, such as natural or synthetic rubber. Alternatively, the valve core may include a valve core body, and a sealing member which includes a resilient sealing surface for engagement with the valve seat. The valve core flange can also be shaped to accommodate the particular constriction formed within the chamber. The valve core flange can be shaped or configured allowing it to be compressed or moved downwardly past the constriction without undue force, yet the valve core flange configuration makes it much more difficult to return the valve core to its first position. For example, the lower end of the valve core flange can be slightly tapered, while the upper end can have a distinct edge or corner preventing it from being easily forced upwardly beyond the constriction.

Other features and advantages of the invention will become apparent from a review of the drawings, taken in conjunction with the following written description.

BRIEF DESCRIPTION OF THE DRAWINGS

FIG. 1 is a perspective view of a pressure vessel or container receiving a flow of fluid from a product source, and illustrating the nonrefillable valve of the invention installed on the pressure container;

FIG. 2 is an exploded perspective view of the nonrefillable valve of this invention illustrating the component parts thereof including a fragmentary perspective view of the valve body;

FIG. 3 is a vertical section illustrating the internal components of the valve, and operation of the valve when the pressure container is being filled or charged;

FIG. 4 is another vertical section illustrating the valve moved to its closed position;

FIG. 5 illustrates another vertical section when the valve is opened thus allowing fluid flow out of the pressure container; and FIG. 6 is another vertical section illustrating the valve in the open position; however, preventing the pressure container from being refilled.

DETAILED DESCRIPTION OF THE INVENTION

Referring to FIG. 1, a pressure container or pressure vessel C is provided with the nonrefillable valve 10 of the invention for filling and selective emptying of the container C. Valve 10 can be welded, threaded or otherwise affixed to the container C. In order to fill the container, a product source P produces a flow of fluid through line L which communicates with the valve 10. Container C simply represents a common industrial cylinder or tank which is specifically designed to hold a pressurized fluid/gas therein.

Now referring to FIGS. 2 and 3, the primary components of the valve 10 include a valve body 12 and a valve operating assembly 13, including a number of working parts which are received in the valve body when assembled. The valve body 12 is a cylindrical shaped member including a chamber extending longitudinally therethrough. When the valve operating assembly 13 is positioned within the chamber, the chamber can be conceptually separated into an upper portion 14, a middle portion 16, and a lower portion 18. As well understood by those skilled in the art, the valve body may be made of a suitable metal such as aluminum or stainless steel. The inner or interior surface 17 defining the chamber of the valve body includes a restriction or constriction 19, shown in the form of a machined inner concentric rim 19 formed on the inner surface 17. In lieu of a continuous concentric rim, this feature could include one or more segmented protrusions formed on the inner surface 17 which extend into the chamber and provide a narrowed or constricted area within the chamber. An orifice or passageway 20 communicates with the lower portion 18 of the chamber, and this passageway 20 communicates directly with the interior opening 21 of the pressure container. A valve seat 22 is provided at the interface or junction between lower portion 18 of the chamber and passageway 20. As shown in FIG. 3, the pressure container C includes an internally threaded neck 23 which receives the threaded extension 24 of the valve body.

The handle 30 is provided for manipulating the valve operating assembly. The handle 30 connects or is integral with a valve stem which extends into the chamber. An upper portion 32 of the valve stem resides in the upper portion 14 of the chamber. As shown, upper portion 32 has an externally threaded area 33 which is threaded into the upper portion 14 of the chamber which may include a set of matching internal threads. Alternatively, as shown in the Figures, the upper portion 14 of the chamber can have a cylindrical insert 26 which is press fit into the upper portion 14 of the chamber. Accordingly, the cylindrical insert 26 would be threaded on its interior surface to accommodate the external threads 33 of the valve stem. The lower portion 34 of the valve stem further extends into the middle portion 16 of the chamber. The lower portion 34 includes one or more grooves 35 which have O-rings 38 mounted thereover. The distal or lower end of the valve stem has a cylindrical bore 36 formed therein. As shown in FIG. 3, the bore 36 extends substantially the length of the lower portion 34 of the valve stem.

A valve core 40 is slidably received within the valve stem bore 36. Valve core 40 includes an upper cylindrical section which is received within the bore 36, and includes a valve core flange 42 having a larger cross sectional area or diameter in comparison to the upper cylindrical section of the valve core. The valve core 40 is further defined by a substantially flat upper edge 44 of the valve core flange 42. A sealing member 46 is attached to the distal end of the valve core 40. Sealing member 46 may be attached as by screw 48, or may be simply glued to the distal end of the valve core. A nozzle 52 extends transversely with respect to the longitudinal axis of the valve body 12. Nozzle 52 may simply be a cylindrical shaped extension including a passageway 50 which communicates directly with the chamber of the valve body. Passageway 50 is located to intersect with inner concentric rim 19. Therefore, inner concentric rim 19 terminates at the passageway 50. As also shown, a greater cross sectional area defining the passageway 50 extends above rim 19 as opposed to the cross sectional area of passageway 50 extending below rim 19.

After the valve operating assembly 13 is inserted within the chamber of the valve body, the upper end 56 of the valve body may be crimped to retain the valve operating assembly 13 therein. In order to prevent inadvertent actuation of handle 30, the safety clip 58 may be engaged in slot 59 to prevent the handle from being rotated. Additionally, a cap 54 may be provided to cover the nozzle 52 prior to use.

Now the operation of the valve will be explained with respect to FIGS. 3–6. FIG. 3 illustrates the valve 10 when the cylinder C is being filled. As shown, line L introduces a flow of fluid through passageway 50, through lower portion 18 of the chamber, through orifice 20 and into the interior opening 21 of the container C. The valve core 40 is positioned such that the valve core flange 42 resides above the inner concentric rim 19. After the container C has been filled, the retaining clip 58 is removed, and the handle 30 is operated to close the valve. Specifically, the handle is rotated causing the valve stem to displace downwardly into the chamber. As the valve stem moves, it forces the valve core flange 42 beyond the inner concentric rim 19. The valve core flange is of sufficient resiliency that it can be forced beyond the rim 19 without permanent deformation. When the handle is fully screwed down, the sealing member 46 closes off the orifice 20 by firmly contacting the valve seat 22. The position of the valve in FIG. 3 can be defined as the first or pre-position, and the position of the valve in FIG. 4 can be defined as the second or closed position.

When it is desired to evacuate the fluid within the container, the handle 30 is unscrewed thus raising the valve stem within the chamber. The valve stem is raised to an extent which allows the sealing member 46 to separate from contact with valve seat 22. Accordingly, fluid may then flow out of the pressure container through orifice 20, lower portion 18 of the chamber, and finally back through passageway 50 of the nozzle. Because the upper portion of the valve core is freely slidable within the valve stem bore 36, the valve core 40 rises in response to the pressurized fluid within the container C. However, the constriction created by the inner concentric rim 19 prevents the valve core flange 42 from displacing above the rim 19. The valve core flange 42 is sized with respect to the inner concentric rim 19 such that pressurized fluid within the container cannot provide enough force to push or force the valve core flange 42 back above the inner concentric rim 19. The position of the valve shown in FIG. 5 can be defined as a third position, or an open position. As shown in FIG. 6, when the valve is in the open position, refilling of the container is prevented. If flow of fluid is reintroduced through passageway 50, the majority of flow through passage 50 enters the chamber above the valve core flange 42. Centerline X—X of passageway 50 illustrates that the majority of the inner concentric rim 19 lies below the centerline X—X of the passageway 50. O-rings 38 prevent flow of fluid upwardly through the valve chamber. Accordingly, the middle portion 16 of the chamber becomes pressurized thus forcing the valve core 40 downwardly in sealing engagement with valve seat 22.

FIG. 5 illustrates that some fluid may escape the chamber into the passageway 50 on all sides of the valve core flange 42. This is because there is no need to effectively seal the upper edge 44 of the valve core flange 42 with respect to the inner concentric rim 19. So long as there is some gap between the inner surface 17 and the inner surface 53 defining the passageway 50, a controlled amount of fluid will be able to escape from the cylinder in the open position.

Although the invention has been primarily described for use with a compressed gas container, the invention can also be used with other pressurized fluid containers or other pressurized liquid systems.

The simple design of the valve operating assembly allows the valve to be positioned in either an open or closed position, and also automatically prevents refill of the container by the independent movement of the valve core with respect to the valve stem. This simple sliding relationship between the valve stem and valve core allows the valve to function as a check valve to prevent refilling of the container.

The valve stem may be machined of durable, lightweight metal such as aluminum. The valve core may be constructed of a suitably strengthened plastic or rubber. The sealing member itself is preferably made of a resilient rubber material.

Although the invention has been described with respect to a preferred embodiment, it shall be understood that the invention is not so limited because other variations and modifications are intended to be covered within the spirit and scope of the invention.

What is claimed is:

1. A non-refillable valve adapted for use with a pressure container, said valve comprising:

a valve body having an inner surface defining a longitudinally extending chamber extending therethrough, said chamber having a lower portion communicating with the pressure container to allow selective filling and discharge of said container, said chamber including a valve seat positioned in said lower portion of said chamber, said inner surface having a concentrically oriented protrusion extending from said inner surface into said chamber, and a transverse opening formed in said valve body and communicating with said valve chamber, said transverse opening intersecting said protrusion;

a valve stem disposed in said chamber and being movable in said chamber, said valve stem including a valve core communicating with said valve stem, said valve core being independently movable in said chamber relative to said valve stem, said valve core including a flange having a substantially flat upper edge and a sealing member attached to a distal end of said valve core; and wherein said valve operates to allow fluid to flow through said opening and chamber to fill the container when said valve stem is in a first position, and further wherein said valve operates to seal the container to prevent filling and discharge of the container when said valve stem is placed in a second position, the second position achieved by extending an end of said valve stem below said protrusion and forcing said valve core beyond said protrusion and into contact with said valve seat.

2. A valve, as claimed in claim 1, wherein:

said sealing member contacts said valve seat in the second position.

3. A valve, as claimed in claim 1, wherein:

said valve stem has a bore formed therein, and said valve core is slidably received in said bore and movable in said bore as influenced by the positioning of said valve stem and by pressure of a fluid entering or exiting said valve.

4. A valve, as claimed in claim 1, wherein:

said valve stem includes at least one O-ring abutting said inner surface of said valve body for sealing said valve stem with respect to said valve body.

5. A valve, as claimed in claim 1, wherein:

said valve further includes a handle integral with said valve stem for operating said valve stem.

6. A valve, as claimed in claim 1, wherein:

said valve further includes a nozzle attached to said valve body, said nozzle having a passageway communicating with said transverse opening of said valve body, said nozzle extending away from said valve body at an angle thereto.

7. A valve, as claimed in claim 1, wherein:

said valve stem is positionable in a third position to allow flow of fluid out of said pressure container and back through said chamber and said transverse opening; however, said third position preventing flow of fluid through said transverse opening and said chamber into the pressure container, thus preventing the refilling of the container.

8. A valve, as claimed in claim 7, wherein:

said third position is defined by said valve stem being raised to a level allowing said valve core to slide upward in response to fluid pressure from the container, or slide downward in response to pressure from fluid entering the chamber, said downward movement of said valve core causing said valve core to seal itself with respect to said valve seat.

9. A nonrefillable valve adapted for use with a pressure container, said valve comprising:

a valve body having an inner surface defining a chamber extending therethrough, said chamber communicating with the pressure container to allow selective filling and discharge of the container, said inner surface having means extending into said chamber thereby creating a constriction in said chamber, said chamber further including a lower portion communicating with a transverse passageway formed in said valve body, said transverse passageway intersecting said constriction;

means mounted in said chamber for controlling flow of fluid through said valve, said means for controlling being selectively positionable in first, second, and third positions, said means for controlling including a flange having a substantially flat upper edge and a sealing member attached to a distal end of said controlling means;

means for positioning said means for controlling, said means for positioning mounted in said chamber and placed in contact with said means for controlling; and wherein said means for positioning enables said means for controlling to move from said first position to said second position, said first position enabling fluid flow through said valve to fill the pressure container, said second position preventing fluid flow to and from the pressure container; and wherein said means for positioning enables said means for controlling to be positioned in the third position to allow flow of fluid from the pressure container and back through said valve, yet prevents fluid flow through said valve and into the pressure container, said means for controlling being independently movable with respect to said means for positioning while said means for controlling is in said third position.

10. A valve, as claimed in claim 9, wherein:

said means for controlling is slidably received in said means for positioning.

11. A valve, as claimed in claim 9, wherein:

said means for positioning includes a valve stem mounted within said chamber, and a handle attached to said valve stem.

12. A valve, as claimed in claim 9, further including:

a nozzle attached to said valve body at said transverse passageway.

13. A method of controlling flow to and from a pressure container, said method comprising the steps of:

attaching a valve to the pressure container, the valve communicating with an opening of the pressure container, the valve including a valve body defining a chamber therein, a valve stem inserted within the valve body, the valve stem including a slidable valve core inserted within a bore of the valve stem, the valve core including a flange having a substantially flat upper edge and a sealing member attached to a distal end of the valve core, a protrusion extending from an inner sidewall of the valve body into the chamber, the protrusion intersecting a transverse passageway that opens into the chamber, and a valve seat located at a lower end of the valve in the chamber;

setting the valve to a first position wherein the valve core is positioned in the chamber above the protrusion;

providing a first flow of fluid through the valve and into the container for filling the container with a desired fluid, said distal end of the valve core intersecting or positioned above the transverse passageway during filling, the fluid moving below and/or circumferentially and exteriorly around the valve core during filling;

operating the valve to move the valve core downwardly beyond the protrusion and in seating engagement with the valve seat of the valve, thus sealing the pressure container;

operating the valve to a third open position allowing fluid to evacuate from the container back through the valve, the fluid moving below and/or circumferentially and exteriorly around the valve core during evacuation; and providing a second flow of fluid into the valve, thereby causing said valve core to slide downwardly with respect to the valve stem causing the valve core to return to its seated position against the valve seat, thereby preventing flow of the second fluid into the pressure container.

14. A method, as claimed in claim 13, further comprising the step of:

preventing the valve core from rising above the protrusion thereby allowing fluid to flow into the valve above the valve core thus forcing the valve core to engage the valve seat.

15. A non-refillable valve adapted for use with a pressure container, said valve comprising:

a valve body having an inner surface defining a longitudinally extending chamber extending therethrough, said chamber having a lower portion communicating with the pressure container to allow fluid flow to and from said container, said chamber including a valve seat positioned in said lower portion of said chamber, said inner surface having a concentrically oriented protrusion extending from said inner surface into said chamber;

a transverse opening formed in said valve body through said inner surface and communicating with said valve chamber, said transverse opening defining a cross-sectional area open to said chamber, said protrusion situated such that the protrusion lies within the area of the transverse opening and below a majority of the area of the transverse opening;

a valve stem disposed in said chamber and being movable in said chamber, said valve stem including a valve core communicating with said valve stem, said valve core being independently movable in said chamber relative to said valve stem, the valve core including a flange having a substantially flat upper edge and a sealing member attached to a distal end of the valve core; and wherein said valve operates to allow fluid to flow through said opening and chamber to fill the container when said valve stem is in a first position, said distal end of the valve core intersecting or positioned above the transverse opening during filling, the fluid moving below and/or circumferentially and exteriorly around the valve core during filling, and wherein said valve operates to seal the container to prevent filling and discharge of the container when said valve stem is placed in a second position forcing said valve core beyond said protrusion and into contact with said valve seat, and further wherein said valve stem is positionable in a third position to allow flow of fluid out of said pressure container and back through said chamber and said transverse opening, the fluid moving below and/or circumferentially and exteriorly around the valve core when flowing out of said pressure container; however, said third position preventing flow of fluid through said transverse opening and said chamber into the pressure container due to greater fluid pressure existing in the chamber area above said protrusion than in the chamber area below said protrusion, thus preventing the refilling of the container due to said valve core contacting said valve seat.

16. A valve, as claimed in claim 15, wherein:

said sealing member of said valve core contacts said valve seat in the second position.

17. A valve as claimed in claim 16, wherein:

said valve core and said sealing member are made of resilient materials.

18. A valve, as claimed in claim 15, wherein:

said valve stem has a bore formed therein, and said valve core is slidably received in said bore and movable in said bore as influenced by the positioning of said valve stem and by pressure of a fluid entering or exiting said valve.

19. A valve, as claimed in claim 15 wherein:

said valve further includes a nozzle attached to said valve body, said nozzle having a passageway communicating with said transverse opening of said valve body, said nozzle extending away from said valve body at an angle thereto.

20. A valve, as claimed in claim 15, wherein:

said third position is defined by said valve stem being raised to a level allowing said valve core to slide upward in response to fluid pressure from the container, or slide downward in response to pressure from fluid entering the chamber, said downward movement of said valve core causing said valve core to seal itself with respect to said valve seat.

21. A method of controlling flow to and from a pressure container, said method comprising the steps of:

attaching a valve to the pressure container, the valve communicating with an opening of the pressure container, the valve including a valve body defining a chamber therein, a valve stem inserted within the valve body, the valve stem including a slidable valve core inserted within a bore of the valve stem, the valve core including a flange having a substantially flat upper edge and a sealing member attached to a distal end of the valve core, a protrusion extending from an inner sidewall of the valve body into the chamber, a transverse opening formed in the valve body through the inner surface and communicating with the valve chamber, the transverse opening defining a cross sectional area open to the chamber, the protrusion situated such that the protrusion lies below a majority of the area of the transverse opening and intersects the area of the transverse opening, and a valve seat located at a lower end of the valve in the chamber;

setting the valve to a first position wherein the valve core is positioned in the chamber above the protrusion;

providing a first flow of fluid through the valve and into the container for filling the container with a desired fluid, the fluid moving below and/or circumferentially and exteriorly around the valve core during filling;

operating the valve to extend an end of said valve stem below said protrusion and to move the valve core downwardly beyond the protrusion and in seating engagement with the valve seat of the valve, thus sealing the pressure container;

operating the valve to a third open position allowing fluid to evacuate from the container back through the valve, the fluid moving below and/or circumferentially and exteriorly around the valve core during evacuation; and providing a second flow of fluid into the valve, thereby causing said valve core to slide downwardly with respect to the valve stem causing the valve core to return to its seated position against the valve seat, thereby preventing flow of the second fluid into the pressure container.

22. A method, as claimed in claim 21, further comprising the step of:

preventing the valve core from rising above the protrusion thereby allowing fluid to flow into the valve above the valve core thus forcing the valve core to engage the valve seat.

* * * * *